Figure 1:
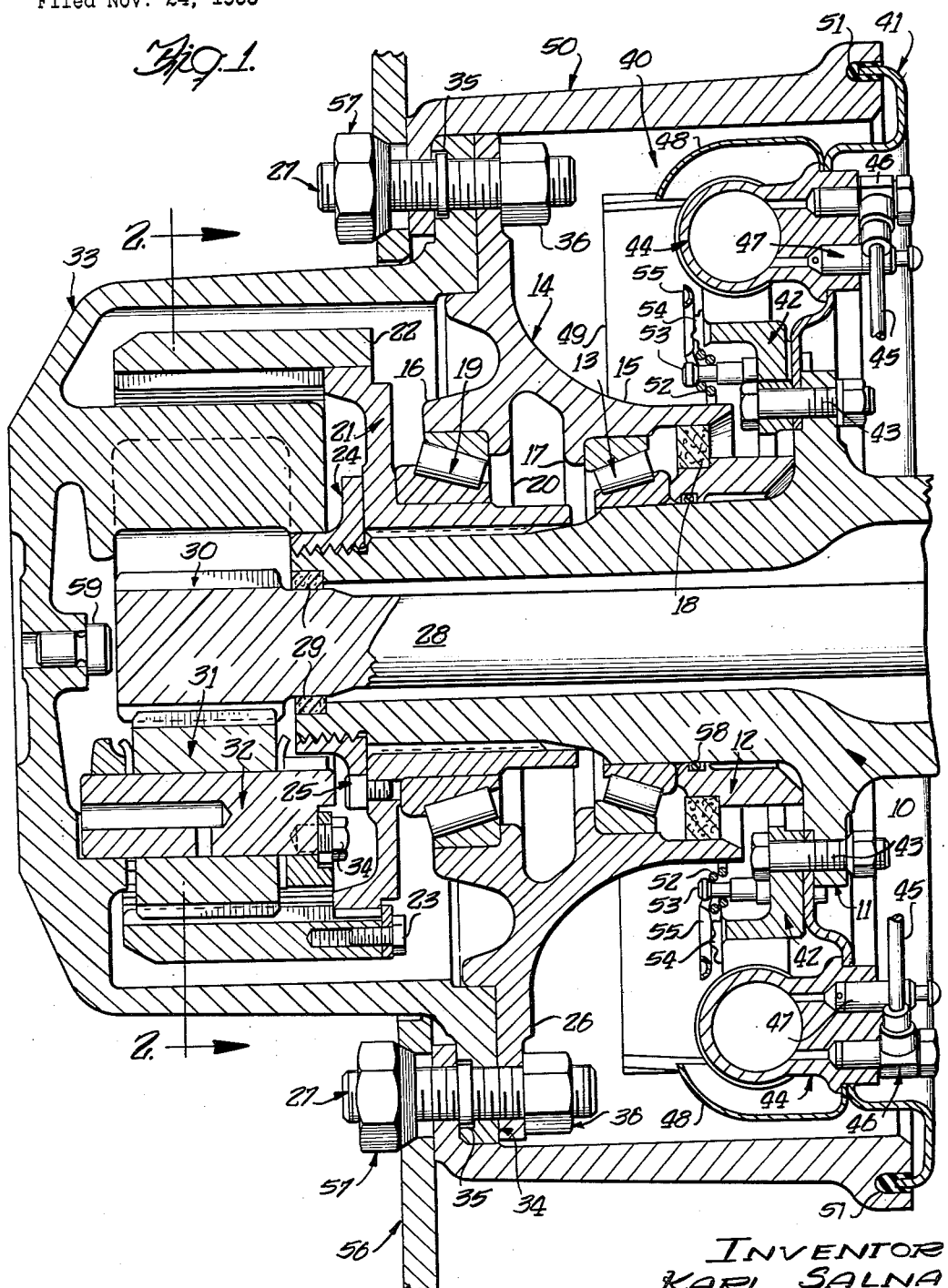

July 10, 1962  K. SALNA  3,043,155
PLANETARY TYPE AXLE ASSEMBLY
Filed Nov. 24, 1958  2 Sheets-Sheet 1

INVENTOR
KARL SALNA
Paul O. Pippel
ATTORNEY

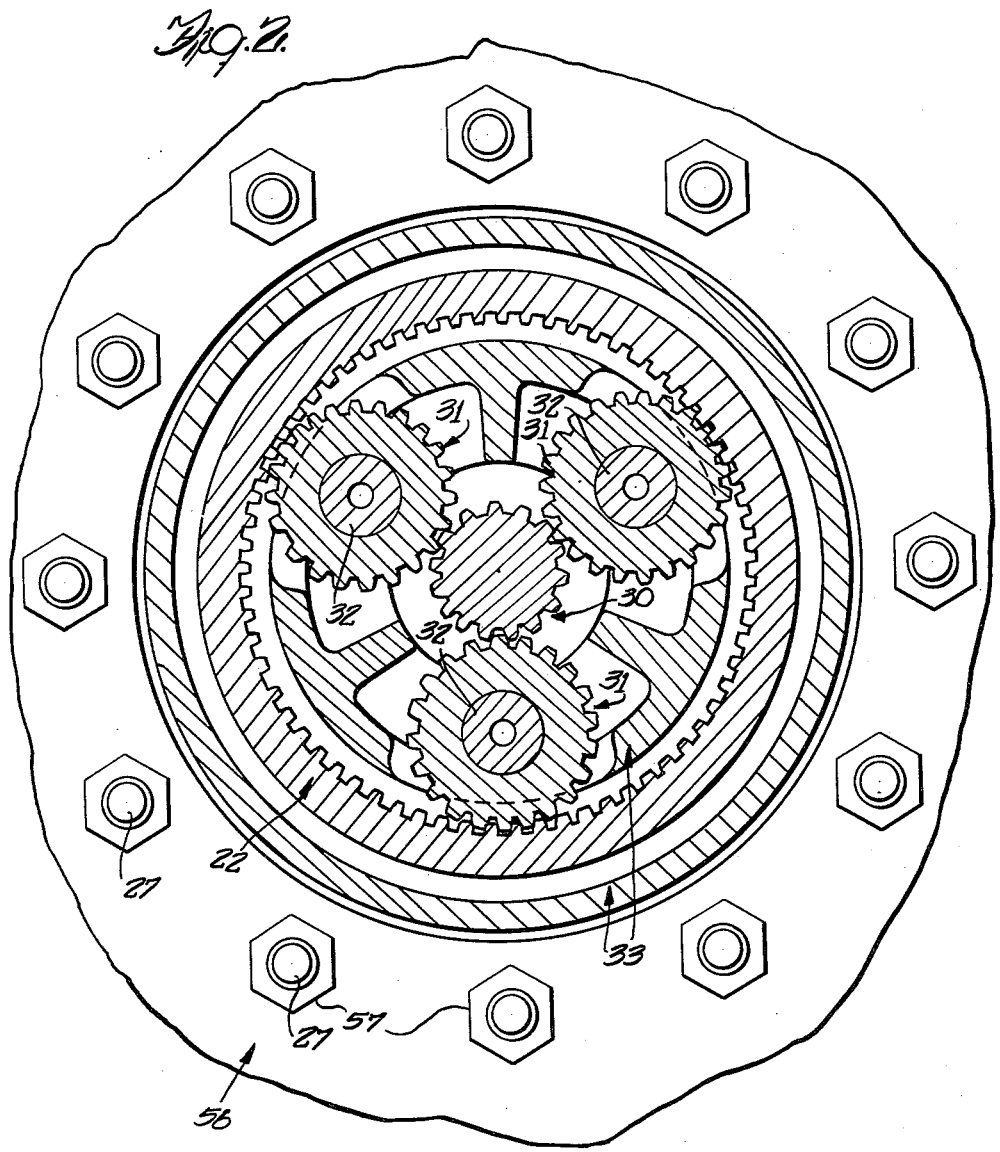

United States Patent Office 3,043,155
Patented July 10, 1962

3,043,155
PLANETARY TYPE AXLE ASSEMBLY
Karl Salna, Oak Park, Ill., assignor to The Frank G.
Hough Co., a corporation of Illinois
Filed Nov. 24, 1958, Ser. No. 775,984
4 Claims. (Cl. 74—391)

This invention relates generally to motor vehicles and more specifically to an improved planetary type driving axle construction.

This invention is directed to those planetary type axle assemblies known in the art wherein the planetary set which provides a speed reduction for one of the wheels of the motor vehicle is contained in the hub assembly of the wheel to thereby obviate the need for any axle or shaft from the planetary set to the wheel disk. Although many of these planetary type axle assemblies are presently used in the art they substantially universally have a number of serious defects. These defects generally arise because of the large torque requirements for such assemblies, especially when one considers their use on large off-the-highway trucks and construction equipment.

It is the object of the present invention to provide a planetary type axle assembly for use in vehicles requiring relatively high torque at the wheels thereof wherein the driving torque is transmitted directly from the planetary set through a one-piece hub section to the wheel disk without being transmitted through any bolts or studs other than the bolts securing the wheel disk to the hub assembly.

It is another object of the present invention to provide a hub assembly for a planetary type axle construction wherein the portion of the hub assembly carrying the main bearings is so disposed and constructed that substantially no torsional loading nor strain from the output side of the planetary set are transmitted to the main bearings.

It is a further object of the present invention to provide means in planetary type axle constructions as aforementioned for permitting disassembly of the wheel disk and brake drum without in any way disturbing or removing any part of the planetary set or main bearings.

A feature of the present invention is the construction of a planetary type axle assembly which has a relatively long life in use because the rotating torque transmitting member of the hub assembly is of a one-piece construction.

A second feature of the present invention is the construction of a planetary type axle assembly wherein there is substantially no misalignment of the main bearings as a result thereof a maximum of wear and destruction of the main bearings due to minimum disturbance in bearing alignment as caused by torsional deflection in torque carrying members and consequently minimum wear and destruction.

A further feature of the present invention is the construction of a planetary type axle assembly wherein the maintenance thereof is greatly facilitated because the wheel disk and brake drum may be removed without disassembling or disturbing any part of the planetary set or main bearings, and wherein the planetary set of the axle assembly is mounted in the outwardmost portion of the axle assembly to obviate the need for any driving axles or shafts from the planetary set to the wheel disk.

Other objects and features of the present invention will be apparent upon a perusal of the following specification and drawings of which:

FIGURE 1 is a plan view substantially in cross section of a planetary type axle assembly constructed according to the present invention, and FIGURE 2 is another cross sectional view thereof and taken along a line such as line 2—2 of FIGURE 1.

The present embodiment is the preferred embodiment, but it is to be understood that changes can be made in the present embodiment by one skilled in the art without departing from the spirit and scope of the present invention.

For a general description of the present invention reference is made to the drawings. The planetary set which drives the wheel disk is mounted on the outermost portion of the axle housing. The ring gear of the planetary set is splined on the end of the axle housing. The driving axle is provided with a sun gear at the end thereof which engages a plurality of planet pinion gears which in turn mesh with the ring gear. The hub is a two piece assembly and one hub portion directly carries the planet pinion gears and extends over the planetary set to a vertical plane disposed between the main bearings which are mounted on the axle housing inwardly of the planetary set. The other hub portion is supported on the main bearings and extends substantially radially outwardly therefrom to meet the inward end of the aforementioned portion of the hub assembly. The hub portion supported on the main bearings and the outer hub portion, the wheel disk, and the brake drum are all bolted together by a single series of threaded studs and nuts extending thereabout. The brake assembly for the wheel is disposed inwardly of the planetary set and the main bearings. The sun gear on the end of the driving axle drives the planet pinion gears which move about the inner circumference of the ring gear. The driving torque is then transmitted from the planet pinion gears to the outer hub portion and therefrom directly to the wheel disk through the studs securing the wheel disk to the outer hub portion. Because of the line of cleavage between the outer hub portion and the hub portion carried on the main bearings, substantially none of the torsional loads or strain which are developed in the outer hub portion are transmitted through the hub portion carried on the main bearings to cause any misalignment thereof. Any twisting of the outer hub portion due to torsional loading will result in a sliding movement along the plane of contact of the outer hub portion and the hub portion carried on the main bearings. When necessary to service the brake assembly for the wheel, the nuts which are threaded onto the studs are removed and the wheel disk and brake drum may then be removed from the studs to provide free access to the brake assembly for the wheel. It should further be noted that the outer hub encloses the planetary set therewithin and transmits the driving torque directly to the wheel disk without the use of any additional axle means from the planetary set to the wheel disk.

For a detail description of the present invention continued reference is made to the drawings. Only a portion of the outer end of the axle housing 10 is shown, it being understood that the remainder thereof may be constructed in any manner commonly known in the art. The axle housing 10 is provided with an annular flange 11 which is integrally formed thereon. A somewhat cylindrical spacer member 12 is disposed about the axle housing 10 and abuts the outward side of the annular flange 11. The inner race of the roller bearing set 13, which is one of the main bearings for the wheel, is positioned on the axle housing 10 and abuts the outer edge of the cylindrical spacer 12. The outer race of the roller bearing set 13 is disposed in the inward end of the hub portion 14. The hub portion 14 is formed to have an inwardly projecting cylindrical section 15 and an outwardly projecting cylindrical section 16. The roller bearing set 13 is positioned within the cylindrical section 15 of the hub portion 14 and the outer race of that roller bearing set abuts the inward side of a radially inwardly projecting annular flange 17 integrally formed in the hub portion 14. An annular shaped lubricating fluid seal 18 is mounted on the cylindrical spacer 12 within the inward end of the cylindrical section 15 of the hub portion 14. The cylindrical section 16 of the hub portion 14 is carried on the roller bearing set 19 which is the other main bearing for the axle assembly of the present invention. The cylindrical section 16 of the hub portion 14 is provided with a radially inwardly projecting annular flange 20, the outward edge of which abuts the inward side of the outer race of the roller bearing set 19. The inner race of the roller bearing set 19 abuts, with its outward edge, the inner side of the radially extending portion of a carrier 21. The carrier 21 is splined onto the end of the axle housing 10 immediately inwardly of a threaded end portion thereof. The carrier 21 is provided for the ring gear 22 and the ring gear 22 is secured about the peripheral edge portion of the carrier 21 by a series of bolts such as bolt 23. The carrier 21 in addition to supporting the ring gear 22 serves in combination with the nut 24 to adjust the spacing on the main bearings 13 and 19. The nut 24 which is threaded onto the outer end of the axle housing 10 is provided with a radially extending flange section which abuts the outward side of the carrier 21. Thus it may be seen that when the nut 24 is tightened onto the axle housing 10, the radially extending flange section of the nut 24 will move the carrier 21 along its splined connection with the axle housing, which will in turn move the roller bearing set 19 inwardly, which in turn will move the hub portion 14 inwardly, which in turn will move the roller bearing set 13 inwardly against the cylindrical spacer member 12 to take up any play or looseness in the roller bearing sets 13 and 19. A cap screw 25 is provided for locking the nut 24 in any tightened or adjusted position relative to the carrier 21. The hub portion 14 is further provided with a radially outwardly extending flange 26 which flange is provided with a series of spaced holes therethrough peripherally thereabout for the threaded studs 27.

The driving axle 28 is positioned axially in the axle housing 10 and extends through an annular shaped oil seal 29. Sun gear 30 is formed on the outer end of axle 28. Sun gear 30 is positioned to mesh with three planet pinion gears 31. Each of the planet pinion gears is rotatively carried on a shaft 32. Each of the shafts 32 is secured in the outer or planet pinion carrier hub portion 33 by capscrews such as capscrew 34, with the planet pinion gears 31 also meshing with the ring gear 22. From the foregoing it may be seen that when the axle 28 is rotated, the planet pinion gears 31 are caused to move about the inner circumference of the ring gear 22 to thereby drive the outer or planet pinion carrier hub portion 33 at a reduced speed from that of the axle 28. The planet pinion carrier hub portion 33 is formed as a one-piece member which is somewhat bowl-shaped with a radially outwardly extending annular flange 34. The annular flange 34 of the planet pinion carrier hub portion 33 is provided with a number of openings spaced thereabout for alignment with the holes in the radially extending flange section 26 of the hub portion 14. Each of the holes of the hub portion 33 is provided with a seat 35 of a greater diameter for therein receiving the shoulder formed on the threaded studs 27. With nuts 36 threaded onto the inner end of the threaded studs 27, the two hub portions 33 and 14 are fastened together such as shown in FIGURE 1. It should here be noted that the driving torque transmitted to the hub portion 33 from the planet pinion gears 31 is transmitted therethrough by the solid portions thereof to the threaded studs 27. It should also be noted that any torsional stresses which occur in the hub portion 33 will result in a sliding movement along the plane of contact of the annular flange 34 of hub portion 33 and the annular flange 26 of hub portion 14 thereby freeing the main bearings 13 and 19 from any misalignment due to any twisting of the hub portion 14 since the driving torque from the panet pinion gears 31 is not transmitted through any portion of the hub portion 14.

The brake assembly 40 may be of any suitable type known in the art and that shown partially in FIGURE 1 is one known type thereof. The brake assembly 40 is carried by the annular flange 11 of the axle housing 10. The brake assembly 40 comprises a backing plate 41 and brake cylinder brackets 42 which are together secured to the annular flange 11 by a plurality of bolts such as bolts 43. The brake cylinders 44 are carried on the bracket 42 and each brake cylinder 44 is provided with a brake fluid line 45 connected thereto through a fitting 46. Each of the brake cylinders 44 is also provided with a valve 47 for bleeding air from the brake cylinder. Covers 48 carried over the brake cylinders 44 serve to keep dust and dirt from the brake cylinders 44. Brake shoe 49 is operatively connected to the cylinders 44 by linkage means (not shown). The brake shoes such as brake shoe 49 operatively engage the brake drum 50. The brake drum 50 is provided with a plurality of holes for carrying the brake drum 15 on the threaded studs 27 outwardly of the flange 34 of the hub portion 33. The inward edge of the brake drum 50 engages a turned flange portion of the backing plate 41 and sealing means 51 also mounted thereon maintains the brake assembly 40 as a sealed unit. Coil springs 52 connected between opposite brake shoes 49 bias the brake shoes to the off position and these coil springs 52 are carried on pins 53 which in turn are secured to the bracket 42. The brake shoes 49 are adjusted in spacing relative to the brake drum 50 by the toothed wheels 54. Leaf springs 55 engage the teeth of the toothed wheels 54 to maintain the brake shoes in any adjusted position. When hydraulic brake fluid is delivered under pressure through the line 45, the brake cylinders will move the brake shoes 49 radially outwardly against the brake drum 50 to provide a braking action on the wheel assembly.

The brake drum 50 is carried on the outwardly extending section of the threaded studs 27 and the wheel disk 56 which is also provided with a plurality of openings, is disposed upon the threaded studs 27 outwardly of the brake drum 50. Wheel nuts 57 are then threaded onto the outer ends of the studs 27 to secure the wheel disk 56 and the brake drum 50 in place.

Lubricating oil is provided in the space defined by the hub portions 33 and 14 and is retained therein to substantially lubricate the planetary gearing and the main bearings 19 and 13 by the lubricating fluid seals 18 and 29 and the O-ring 58 which is carried in a suitable annular slot in the spacer member 12. The pin 59 which is formed of a hardened steel is carried within the hub portion 33 and serves to prevent the floating axle 28 from moving outwardly a distance greater than the small amount shown in FIGURE 1 which is provided for clearance purposes.

In the operation of the subject invention, the rotation of the axle 28 will cause the planet pinion gears 31 to move about the inner circumference of the ring gear 22 and the movement of the planet gears 31 will through their shafts 32 directly rotate the hub portion 33. The driving torque is transmitted through the one-piece hub portion 33 to the threaded studs 27 and from the threaded studs 27 to the wheel disk 56.

The brake drum 50 is of course rotated with the wheel disk 56 and in braking the wheel, the conventional operation of the extension of the wheel cylinders 44 occurs to project the brake shoes 49 against the inner circumference of the brake drum 50.

When it becomes necessary to remove the wheel disk 56 to repair the tire carried thereon, it is merely necessary that the nuts 57 be removed from the threaded studs 27 and the wheel disk 56 is then easily slidable outwardly from the hub portion 33.

Maintenance or repair of the brake assembly is also easily accomplished by merely sliding the brake drum 50 outwardly from the axle assembly after the nuts 57 and wheel disk 56 have been removed.

In conclusion the four important advantages produced by the subject invention and not found in existing similar axle constructions should be noted. Firstly, the planetary set is carried in the outwardmost portion of the hub assembly and therefore no axle is necessary from the planetary set to the wheel disk. Secondly, the output torque from the planetary set is transmitted directly through a one-piece hub portion to the wheel disk studs. Thirdly, the hub portion carrying the main bearings is formed separately from the hub portion transmitting the driving torque in such a manner that none of the torsional loading or strain is transmitted to the main bearings to cause any misalignment thereof, and lastly, the wheel disk and brake drum may easily be removed without disassembling the planetary set.

Having described the invention what is considered known and desired to be protected by Letters Patent is:

1. In a driving axle construction having a planetary set of three members, an axle housing, one member of said planetary set fixedly carried on the outer end of said axle housing to extend outwardly therefrom, a hub assembly comprising two hub portions, a set of main bearings mounted on said axle housing inwardly of said one member of said planetary set, a wheel brake assembly carried on said axle housing inwardly of said set of main bearings, one of said two hub portions being rotatively carried by said set of main bearings and being formed to have a portion thereof extending substantially radially outwardly from said set of main bearings, a plurality of openings formed through the radially extending portion of said one hub portion, the other of said two hub portions being integrally formed as a one-piece member with part of the second member of said planetary set and further being formed to enclose said planetary set therewithin when said second member of said planetary set meshes with said one member of said planetary set, said other hub portion further being integrally formed with a radially extending flange having a plurality of openings therethrough and with said flange contiguously disposed to said radially extending portion of said one hub portion, a brake drum having a radially inwardly extending flange portion, a plurality of openings formed through said flange portion of said brake drum, said brake drum positioned over said brake assembly with said flange portion thereof positioned outwardly of the flange of said other hub portion, a driving shaft carried in said axle housing and connected to drive the third member of said planetary set, and a plurality of threaded studs and nuts for releasably securing said two hub portions together and for removably carrying said brake drum and a wheel disk, each of said studs extending through a hole in said wheel disk, and one of said openings in each of the flanges of said brake drum and said other hub portion, and one of the openings in said radially extending portion of said hub portion.

2. In a driving axle construction having a planetary set comprising a sun gear, a ring gear, and a plurality of planet pinion gears, an axle housing, means fixedly carrying said ring gear to extend outwardly from the outer end of said axle housing, a set of main bearings mounted on said axle housing inwardly of said ring gear, a wheel brake assembly carried on said axle housing inwardly of said set of main bearings, a hub assembly comprising two hub portions, one of said hub portions being rotatably carried by said set of main bearings and being formed to extend substantially radially outwardly from said main bearings, the other of said two hub portions being integrally formed as a one-piece member with said plurality of planetary pinion gears rotatably carried therewithin and further being formed to enclose said planetary set therewithin, said other hub portion further being provided with an integrally formed radially extending flange contiguously disposed to said one hub portion when said planet pinion gears mesh with said ring gear, a driving shaft carried in said axle housing and having said sun gear fixedly secured to the outer end thereof and in mesh with said planet pinion gears, a brake drum having a radially inwardly extending flange portion, said brake drum positioned over said brake assembly with the flange of said brake drum positioned outwardly of said flange of said other hub portion, and a plurality of threaded studs and nuts carried in a plurality of mating holes formed through the flange of said brake drum, the peripheral portions of said one hub portion and the radially extending flange of said other hub portion for releasably securing said two hub portions together and for removably carrying said brake drum and a wheel disk.

3. A hub assembly for a driving axle assembly having an axle housing carrying one member of a planetary set at the outer end thereof and having a driving shaft carried in said axle housing and having a second member of a planetary set secured thereon and having a set of main bearings carried on the axle housing inwardly of the planetary set and having a wheel brake assembly carried on said axle housing inwardly of said set of main bearings comprising, two hub portions, one of said hub portions being formed to be rotatably carried on said set of main bearings and having a portion thereof extending substantially radially outwardly from said set of main bearings, a plurality of openings formed through said radially extending portion of said one hub portion and about the periphery thereof, the other of said two hub portions being integrally formed as a one-piece member carrying the third member of said planetary set therewithin, said other hub portion further being formed to have a radially extending flange contiguously disposed to the radially extending portion of said one hub portion, a brake drum having a radially inwardly extending flange, said brake drum positioned over said brake assembly with the flange of said brake drum positioned outwardly of the flange of said other hub portion, a plurality of mating openings formed through the flange of said brake drum and the flange portion of said other hub portion in alignment with said openings through said one hub portion, and a plurality of threaded studs and nuts cooperating with said openings for releasably securing said two hub portions together and for removably carrying said brake drum and a wheel disk.

4. A hub assembly for a driving axle assembly having an axle housing carrying a ring gear of a planetary set at the outer end thereof and having a driving shaft carried in said axle housing and having the sun gear of said planetary set secured thereon and having a set of main bearings carried on the axle housing inwardly of said planetary set and having a wheel brake assembly carried on said axle housing inwardly of said set of main bearings comprising, two hub portions, one of said hub portions being formed to be rotatably carried on said set of main bearings and having a portion thereof extending substantially radially outwardly from said set of main bearings, a plurality of openings formed through said radially extending portion of said one hub portion and about the periphery thereof, the other of said two hub portions being integrally formed as a one-piece member rotatively carrying the planet pinion gears of said planetary set therewithin and further being formed to enclose said planetary set therewithin, said other hub portion further being formed to have a radially extending flange contiguously disposed to the radially extending portion of said one hub portion, a brake drum having a radially inwardly extending flange, said brake drum positioned over said wheel brake assembly with the flange of said brake drum positioned outwardly of the flange of said other hub portion, a plurality of mating openings formed through the flange of said brake drum and said flange of said other hub portion in alignment with said openings through said one hub portion, and a plurality of threaded studs secured in said openings and nuts for releasably securing said two hub portions together and for removably carrying said brake drum and a wheel disk.

References Cited in the file of this patent

UNITED STATES PATENTS

| | | |
|---|---|---|
| 2,357,343 | Morgan | Sept. 5, 1944 |
| 2,424,578 | Mortag | July 29, 1947 |
| 2,529,330 | Double | Nov. 7, 1950 |
| 2,543,811 | Snow et al. | Mar. 6, 1951 |

FOREIGN PATENTS

| | | |
|---|---|---|
| 539,772 | Great Britain | Sept. 23, 1941 |
| 991,243 | France | June 20, 1951 |